United States Patent [19]

Linhart et al.

[11] 4,400,321
[45] Aug. 23, 1983

[54] PROCESS FOR THE PREPARATION OF SOLUTIONS OF CATIONIC POLYAZO DYESTUFFS

[75] Inventors: Karl Linhart, Leverkusen; Harald Gleinig, Odenthal-Neschen; Roderich Raue; Hans-Peter Kühlthau, both of Leverkusen, all of Fed. Rep. of Germany

[73] Assignee: Bayer Aktiengesellschaft, Leverkusen, Fed. Rep. of Germany

[21] Appl. No.: 274,338

[22] Filed: Jun. 17, 1981

[30] Foreign Application Priority Data

Jul. 5, 1980 [DE] Fed. Rep. of Germany ....... 3025557

[51] Int. Cl.³ .............................................. C09B 31/02
[52] U.S. Cl. .................................................. 260/186
[58] Field of Search ........................................ 260/186

[56] References Cited

U.S. PATENT DOCUMENTS

| | | | |
|---|---|---|---|
| 3,793,305 | 2/1974 | Balon | 260/186 UX |
| 3,941,768 | 3/1976 | Stocker | 260/186 UX |
| 4,058,517 | 11/1977 | Bermes | 260/186 UX |

*Primary Examiner*—Paul F. Shaver
*Attorney, Agent, or Firm*—Sprung, Horn, Kramer & Woods

[57] ABSTRACT

To prepare concentrated solutions of cationic polyazo dyestuffs of the formula

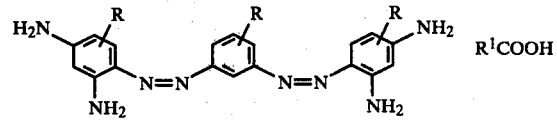

in which
R represents hydrogen or methyl and
$R^1$ represents an alkyl radical which has 1 to 3 carbon atoms and is optionally substituted by hydroxyl, alkoxy or halogen, and mixing coupling products thereof with aromatic monoamines, diaminobenzenes of the general formula

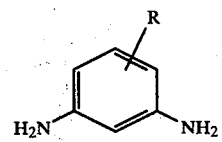

in which
R has the abovementioned meaning,
if appropriate mixed with up to 30 mol % of aromatic monoamines of the formula

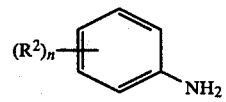

in which
$R^2$ represents hydrogen, $C_1$- to $C_4$-alkyl, $C_1$- to $C_4$-alkoxy or $C_1$- to $C_4$-acylamino and
n denotes a number from 1 to 3, are dissolved in aliphatic carboxylic acids which have 2 to 4 carbon atoms and can optionally be substituted by halogen, hydroxyl or alkoxy, and are reacted with 0.5 to 0.75 mol of a salt or ester of nitrous acid per mol of diamine at 0° to 30° C.

4 Claims, No Drawings

PROCESS FOR THE PREPARATION OF SOLUTIONS OF CATIONIC POLYAZO DYESTUFFS

The invention relates to a process for the preparation of concentrated solutions of cationic polyazo dyestuffs of the formula

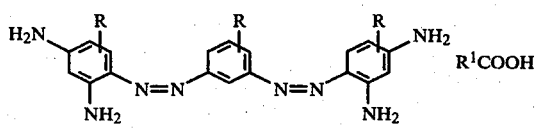

in which
R represents hydrogen or methyl and
$R^1$ represents an alkyl radical which has 1 to 3 carbon atoms and is optionally substituted by hydroxyl, alkoxy or halogen,
and mixed coupling products thereof with aromatic monoamines, characterised in that diaminobenzenes of the general formula

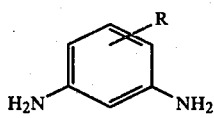

in which
R has the abovementioned meaning,
if appropriate mixed with up to 30 mol% of aromatic monoamines of the formula

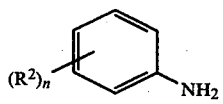

in which
$R^2$ represents hydrogen, halogen, $C_1$- to $C_4$-alkyl, $C_1$- to $C_4$-alkoxy or $C_1$- to $C_4$-acylamino and
n denotes a number of from 1 to 3,
are dissolved in aliphatic carboxylic acids which have 2 to 4 carbon atoms and can optionally be substituted by halogen, hydroxyl or alkoxy, and are reacted with 0.5 to 0.75 mol of a salt or ester of nitrous acid per mol of diamine at 0° to 30° C.

Dyestuffs of the formula I have been known for a long time, by the names bismarck brown and vesuvin. They are prepared by reacting a solution of m-phenylenediamine, containing hydrochloric acid, with sodium nitrite. The evolution of nitrogen with the formation of weakly basic compounds and also coupling to give higher-molecular, insoluble dyestuffs, as a side-reaction, are observed (E. Täuber and F. Walder, B 30, 2,111, 2,899, B 33, 2,897). Dyestuffs thus prepared are suitable for the preparation of dyestuff solutions only after they have first been purified. The formation of higher-molecular products can be avoided if the coupling is carried out in the presence of large amounts of sodium chloride (U.S. Pat. No. 2,022,606). Further purification operations are necessary for a concentrated dyestuff solution to be prepared from this dyestuff with a high salt content. For example, the dyestuff can be freed from the salt by a procedure in which the solution is passed once or several times, under pressure, through a semipermeable membrane which allows water and salt to pass through, whilst dyestuffs are retained (DE-AS (German Published Specification) 2,204,725, Example 9).

In another process which has already been described, a solution is prepared by first converting the dyestuff into the dye base and then dissolving this in a mixture of glacial acetic acid and diethylene glycol monobutyl ether (U.S. Pat. No. 3,346,322, example 12).

When m-phenylenediamine is diazotised in aliphatic carboxylic acids with sodium nitrite in a molar ratio of ½, a complex mixture of diazonium salt, diazoamino compound and mono- and bis-azo dyestuffs which cannot be used for dyeing purposes is formed (B. I. Belov and V. V. Kozlov, Zh. Obsh. Khim., Vol. 32, No. 10, pages 3,362–3,368).

According to this state of the art, it was not to be expected that the process according to the invention would lead to stable dyestuff solutions which are outstandingly suitable for dyeing paper containing mechanical wood pulp.

Suitable diamines of the general formula II are: 1,3-diamino-benzene, 2,4-diamino-toluene and 2,6-diamino-toluene, and mixtures of these diamines in any molar ratio.

Suitable aromatic monoamines of the formula III are: aniline, 2-toluidine, 3-toluidine, 4-toluidine, 4-amino-1,3-dimethyl-benzene, 2-anisidine, 3-anisidine, 4-anisidine, 2-phenetidine, 4-phenetidine, 2-(4-aminophenoxy)-ethanol, 2-chloro-aniline, 4-chloro-aniline, 2,4-dichloro-aniline and 4-amino-acetanilide.

The colour shade of the dyeings on paper can be modified as desired by mixed coupling with the aromatic monoamines. Yellower colour shades are obtained with aniline and redder colour shades are obtained with p-toluidine, p-anisidine and p-phenetidine.

Suitable aliphatic carboxylic acids are: acetic acid, propionic acid, 2-chloro-propionic acid, glycolic acid, ethoxyacetic acid, mono-, di- and tri-chloroacetic acid and lactic acid. Acetic acid is preferably used.

In a preferred procedure, the aqueous sodium nitrite solution is added dropwise below the surface of the solution of the aromatic amino compounds in aliphatic carboxylic acids. The formation of higher-molecular dyestuff constituents which lead to instability of the solution is thereby virtually completely avoided.

The same effect is achieved if, in another preferred process variant, solid sodium nitrite is added to the solution of the aromatic amine in the aliphatic carboxylic acid, and water is then added dropwise.

The solutions can also contain added organic solvents, for example ethylene glycol, propylene glycol, ethylene glycol monomethyl ether, ethylene glycol monoethyl ether, ethylene glycol monobutyl ether, methylglycol acetate, ethylglycol acetate, glycol diacetate, monoacetin, triacetin, hydroxypropionitrile, urea, dimethylurea, tetramethylurea, thiourea, tetramethylene sulphone, pyrrolidone, N-methyl-pyrrolidone, ethylene carbonate, propylene carbonate, caprolactam and their mixtures. The stability of the solutions in the cold can thereby be improved further. The dyestuff solutions preferably contain 5–30% by weight of the above-mentioned solvents.

In some cases, it has proved advantageous to add oxidising agents, such as $H_2O_2$, in order to stabilise the solutions at elevated temperatures. 0.5–2% by weight of $H_2O_2$ is preferably added to the dyestuff solutions.

The dyestuff solutions prepared according to the invention are used for dyeing cellulose material, in particular paper.

EXAMPLE 1

24.4 g of 2,4-diamino-toluene are dissolved in 60 ml of glacial acetic acid at 50° C. After cooling the solution to 5° C., a solution of 8.8 g of sodium nitrite in 30 ml of water is added dropwise below the surface at 0°–5° C. The dark brown solution is subsequently stirred further at room temperature for some hours and is filtered. Virtually no residue remains on the filter. Paper containing mechanical wood pulp is dyed red-brown.

EXAMPLE 2

122 g of a molten amine mixture consisting of 65% of 2,4-diamino-toluene and 35% of 2,6-diamino-toluene are allowed to run into a solution of 30 g of caprolactam in 295 g of glacial acetic acid. The hot solution with a temperature of 65°–70° C. is cooled to 5° C., and 46 g of sodium nitrite are added. 45 ml of water are then allowed to run slowly in at 0°–10° C. in the course of 3 hours, and the mixture is subsequently stirred for 2 hours.

Paper containing mechanical wood pulp is dyed yellowish-tinged brown by this solution.

EXAMPLE 3

220 g of 2,4-diamino-toluene are dissolved in 1,000 ml of glacial acetic acid, and 19 g of aniline are added. After cooling the mixture to 5° C., 88 g of sodium nitrite, dissolved in 300 ml of water, are added dropwise at 0°–5° C. in the course of 2 hours. After subsequently stirring the mixture for several hours, a residue-free dyestuff solution which dyes paper containing mechanical wood pulp in a clear brown shade is obtained.

If 24.6 g of 4-anisidine are employed instead of 19 g of aniline and the procedure followed is otherwise the same, a dyestuff solution which dyes paper containing mechanical wood pulp a reddish-tinged brown shade is obtained.

EXAMPLE 4

22 g of 2,4-diamino-toluene are dissolved in 100 ml of propionic acid, and 1.9 g of aniline are added. After cooling to 5° C., 8.8 g of sodium nitrite, dissolved in 30 ml of water, are added dropwise to the solution at 0°–5° C. in the course of 2 hours. After subsequently stirring the mixture for several hours, a dyestuff solution which dyes paper containing mechanical wood pulp brown is obtained.

Instead of propionic acid, the same amount of 2-chloro-propionic acid, ethoxyacetic acid or lactic acid can equally successfully be used.

EXAMPLE 5

10.8 g of 1,3-diamino-benzene and 12.2 g of 2,4-diamino-toluene are dissolved in 100 ml of glacial acetic acid and the solution is cooled to 5° C. A solution of 10 g of sodium nitrite in 30 ml of water is added dropwise at 0°–5° C. in the course of 2 hours, and the mixture is subsequently stirred for 6 hours. The dyestuff solution dyes paper containing mechanical wood pulp brown.

EXAMPLE 6

9.7 g of 1,3-diamino-benzene and 11.0 g of 2,4-diamino-toluene are dissolved in 100 ml of glacial acetic acid, and 2.14 g of 2-toluidine are added. The solution is then cooled to 5° C., and a solution of 8.8 g of sodium nitrite in 30 ml of water is added dropwise at 0°–5° C. in the course of 2 hours. After subsequently stirring the mixture for several hours, a dyestuff solution which dyes paper containing mechanical wood pulp brown is obtained.

Instead of 2.14 g of 2-toluidine, 2.46 g of 2-anisidine, 2.54 g of 2-chloro-aniline, 2.54 g of 4-chloro-aniline, 3.24 g of 2,4-dichloro-aniline or 2.74 g of 2-phenetidine can also equally successfully be employed.

EXAMPLE 7

9.7 g of 1,3-diamino-benzene and 11.0 g of 2,4-diamino-toluene are dissolved in 100 ml of glacial acetic acid, and 2.46 g of 4-anisidine are added. After cooling the mixture to 5° C., a solution of 8.8 g of sodium nitrite in 30 ml of water is added dropwise at 0°–5° C., whilst cooling. After stirring the mixture for several hours, a dyestuff solution which dyes paper containing mechanical wood pulp reddish-tinged brown is obtained.

Instead of 2.46 g of 4-anisidine, 2.74 g of 4-phenetidine, 3.06 g of 2-(4-amino-phenoxy)-ethanol or 3.0 g of 4-amino-acetanilide can also equally successfully be employed.

EXAMPLE 8

21.6 g of 1,3-diamino-benzene are dissolved in 100 ml of glacial acetic acid, during which the temperature rises up to 32° C. After cooling the solution to 5° C., a solution of 7.3 g of sodium nitrite in 30 ml of water is added dropwise at 0°–5° C., whilst cooling. The mixture is subsequently stirred at room temperature for 4 hours, and the solution is filtered. No residue remains on the filter. paper containing mechanical wood pulp is dyed brown by this solution.

EXAMPLE 9

22 g of 2,6-diamino-toluene are dissolved in 100 ml of glacial acetic acid at 70° C., and the solution is cooled to 0°–5° C. 1.9 g of aniline are added, and a solution of 8.8 g of sodium nitrite in 30 ml of water is then added dropwise below the surface at 0°–5° C. After stirring the mixture at room temperature for several hours, a clear solution which dyes paper containing mechanical wood pulp yellowish-tinged brown is obtained.

EXAMPLE 10

81.3 g of a mixture consisting of 65% of 2,4-diamino-toluene and 35% of 2,6-diamino-toluene, and 31 g of aniline are dissolved in 240 ml of glacial acetic acid and 30 g of $\epsilon$-caprolactam, whilst warming to about 70° C. After cooling the solution to 5° C., 46 g of sodium nitrite, dissolved in 55.5 ml of water, are added dropwise in the course of 2 hours. The mixture is subsequently stirred overnight at 5°–10° C., and 10 ml of 30% strength $H_2O_2$ solution are then added.

EXAMPLE 11

66.6 g of 1,3-diamino-benzene and 31 g of aniline are dissolved in 240 ml of glacial acetic acid and 30 g of $\epsilon$-caprolactam at room temperature. After cooling the solution to 5° C., a solution of 46 g of sodium nitrite in 55.5 ml of water is added dropwise in the course of 2 hours, and the mixture is subsequently stirred overnight at 5°–10° C. 10 ml of 30% strength $H_2O_2$ solution are then added.

We claim:

1. Process for the preparation of concentrated solutions of cationic polyazo dyestuffs of the general formula

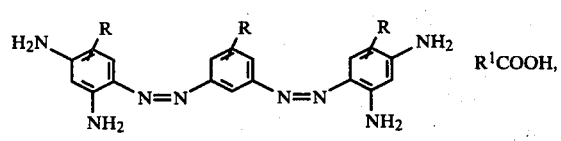

in which
R represents hydrogen or methyl and
$R^1$ represents an alkyl radical which has 1 to 3 carbon atoms and is optionally substituted by hydroxyl, alkoxy or halogen,
and mixed coupling products thereof with aromatic monoamines, characterised in that diaminobenzenes of the general formula

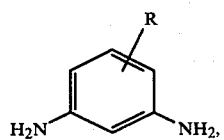

wherein
R has the abovementioned meaning,
if appropriate mixed with up to 30 mol% of aromatic monoamines of the formula

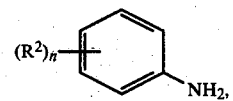

in which
$R^2$ represents hydrogen, halogen, $C_1$- to $C_4$-alkyl, $C_1$- to $C_4$-alkoxy or $C_1$- to $C_4$-acylamino and
n denotes a number from 1 to 3,
are dissolved in aliphatic carboxylic acids which have 2 to 4 carbon atoms and can optionally be substituted by halogen, hydroxyl or alkoxy, and are reacted with 0.5 to 0.75 mol of a salt or ester of nitrous acid per mol of diamine at 0° to 30° C.

2. Process according to claim 1, characterised in that an aqueous sodium nitrite solution is added dropwise below the surface of the solution of the aromatic amino compounds in aliphatic carboxylic acids.

3. Process according to claim 1, characterised in that solid sodium nitrite is added to the solution of the aromatic amines in an aliphatic carboxylic acid, and water is then added dropwise.

4. Process according to claim 1, characterised in that 0.5–2% by weight of $H_2O_2$ is added to the polyazo dyestuff solutions.

* * * * *